US008571547B2

(12) United States Patent
Shinoda et al.

(10) Patent No.: US 8,571,547 B2
(45) Date of Patent: Oct. 29, 2013

(54) PREVENTION OF OVERREACH CONDITION IN CELLULAR COMMUNICATION

(75) Inventors: Koji Shinoda, Farmington Hills, MI (US); Hiroaki Shibata, Novi, MI (US)

(73) Assignees: DENSO International America, Inc., Southfield, MI (US); Denso Corporation, Kariya-shi (JP)

( * ) Notice: Subject to any disclaimer, the term of this patent is extended or adjusted under 35 U.S.C. 154(b) by 583 days.

(21) Appl. No.: 12/725,680

(22) Filed: Mar. 17, 2010

(65) Prior Publication Data

US 2011/0230186 A1    Sep. 22, 2011

(51) Int. Cl.
*H04W 4/00*    (2009.01)

(52) U.S. Cl.
USPC ............. 455/432.1; 455/432.3; 455/556.1; 455/434

(58) Field of Classification Search
USPC ........ 455/420, 432.1, 432.3, 436–440, 452.1, 455/556.1, 557, 90.1, 90.2, 434; 701/2, 701/29.1, 31.4, 31.5, 33.2, 34.4
See application file for complete search history.

(56) References Cited

U.S. PATENT DOCUMENTS

| | | | |
|---|---|---|---|
| 6,975,870 B2 | 12/2005 | Kato et al. | |
| 2002/0045445 A1* | 4/2002 | Higuchi | 455/425 |
| 2002/0187792 A1 | 12/2002 | Kato et al. | |
| 2004/0063427 A1* | 4/2004 | Narasimha et al. | 455/434 |
| 2008/0146202 A1* | 6/2008 | Krause | 455/414.1 |
| 2010/0325510 A1* | 12/2010 | Nogami et al. | 714/750 |

* cited by examiner

*Primary Examiner* — Marcos Torres
(74) *Attorney, Agent, or Firm* — Harness, Dickey & Pierce, P.L.C.

(57) ABSTRACT

A method of wireless communication between a base station and a mobile station may entail scanning a first entry of a preferred roaming list for a first base station channel, transmitting a downlink signal from the base station to the mobile station; determining that the downlink signal to the mobile station from the base station has not been received, scanning the preferred roaming list for a second base station, identifying that the second base station does not exist on the preferred roaming list, and inquiring whether a vehicle ignition is off upon determining that the second base station does not exist. Moreover, the method may entail determining that the vehicle ignition is on, and return an excluded channel of a base station to the preferred roaming list and determine that the vehicle ignition is off and invoke a sleep mode of the digital control module.

10 Claims, 3 Drawing Sheets

PREVENTION OF OVERREACH CONDITION IN CELLULAR COMMUNICATION

FIELD

The present disclosure relates to prevention of an overreach condition in cellular communication.

BACKGROUND

This section provides background information related to the present disclosure which is not necessarily prior art. In certain vehicles employing cell phone communications technology, code division multiple access ("CDMA") may be a channel access method that is utilized. As part of the communication between a base station ("BS"), which is a stationary station, and a mobile station ("MS") such as a vehicle, which is a movable station, a condition of communication overreach may be experienced. An overreach condition in a CDMA system is one in which a downlink signal from the base station can reach the mobile station (e.g. a vehicle) but the uplink signal from the mobile station cannot effectively reach the cellular base station. More specifically, as an example, FIG. 1 depicts a vehicle 10 within which a cellular communication system 12 may reside. Such a cellular communication system 12 may operate using principles of a code division multiple access ("CDMA") protocol and further apply to a telematics system within vehicle 10. Cellular communication system 12 within vehicle 10 may utilize a voice control module 14, which may also be known as a radio unit, for establishing voice communications with remote stations, such as a base station. Cellular communication system 12 may also employ a global positioning system ("GPS") control module 16 for receiving GPS signals for measuring the position of vehicle 10 based on reference location data sent from global, orbiting satellites, a digital control module ("DCM") 18 for controlling the operation of voice control module 14 and GPS control module 16. A vehicle position memory 20 may be used for storing positions of the vehicle calculated and determined by GPS control module 16, and a base station position memory 22 for storing base station position information obtained by communications with base stations. Communications received by voice control module 14 and GPS control module 16 may be facilitated using respective antennas.

Turning to FIGS. 2 and 3, a known condition of overreach is depicted. More specifically, in a condition of overreach, a mobile station ("MS") 24, which may be a vehicle 10, is located outside of (i.e. beyond or not within) a communication range 26 of a first base station ("BS1") 28. When MS 24 is positioned as such, a communication transmission scenario depicted in FIG. 3 may occur. More specifically, BS1 28 may transmit a downlink signal 30 that is received by MS 24; however, an uplink signal 32, which may be transmitted from MS 24, never reaches BS1 28, as represented by a gap between uplink signal 32 and BS1 28 in FIG. 3. Because downlink signal 30 may be the only downlink signal received or the strongest of a multitude of signals received by MS 24, MS24 may continue to transmit an uplink signal 32 to BS1, which is never received, for a period of time that may equal a battery life of a battery 34, which may occur when vehicle engine is off and not charging battery 34. Battery 34 may also supply electricity to components within vehicle 10 other than digital control module 18, such as all other on-vehicle components, such as those that communicate with or are controlled by digital control module 18. Thus, because of ongoing communications experienced during an overreach situation, battery 34 of vehicle 10 may be completely drained of electrical energy and disable vehicle 10, including cellular communication system 12, which may be part of a telematics system.

While depleting the useful life of battery 34 is one problem of a non-received uplink signal 32, another problem is that digital control module 18 cannot provide any service, such as cellular communications as part of a telematics system during periods when MS 24 transmits an unreceived uplink signal to BS1 28, even though MS 24 may indicate that a strong downlink signal 30 is being received from BS1 28.

SUMMARY

This section provides a general summary of the disclosure, and is not a comprehensive disclosure of its full scope or all of its features. A vehicle may employ a digital control module as part of a telematics system that operates on wireless, cellular phone principles. A method of communicating between a cellular phone base station and the telematics system within a vehicle may include scanning, by the digital control module, a preferred roaming list of a plurality of base stations from a beginning of the preferred roaming list, transmitting a first downlink signal from a first base station to the mobile station, and determining that the downlink signal into the mobile station from the first base station has been received. As part of a registration, the mobile station may transmit an uplink signal to the first base station when it is determined that the downlink signal from the first base station has been received. Moreover, the method may entail determining that a condition of overreach exists between the first base station and the mobile station when the uplink signal is not acknowledged by the first base station, excluding the specific channel of the first base station from the preferred roaming list for which the condition of overreach exists, re-scanning the first entry of the preferred roaming list absent the specific channel, and transmitting a second downlink signal from a second base station to the mobile station. Still yet, the method may entail determining that the second downlink signal into the mobile station from the second base station has not been received, determining whether a third base station exists on the preferred roaming list, and determining that a third base station does not exist on the preferred roaming list.

The method of communicating may further provide determining that the vehicle ignition is off, invoking a sleep mode of the digital control module to prevent the digital control module from communicating, and returning the specific channel of the first base station on the preferred roaming list for which the condition of overreach exists. Alternatively, if it is determined that the vehicle ignition is not off, the method may entail returning the specific channel of the first base station on the preferred roaming list for which the condition of overreach exists.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
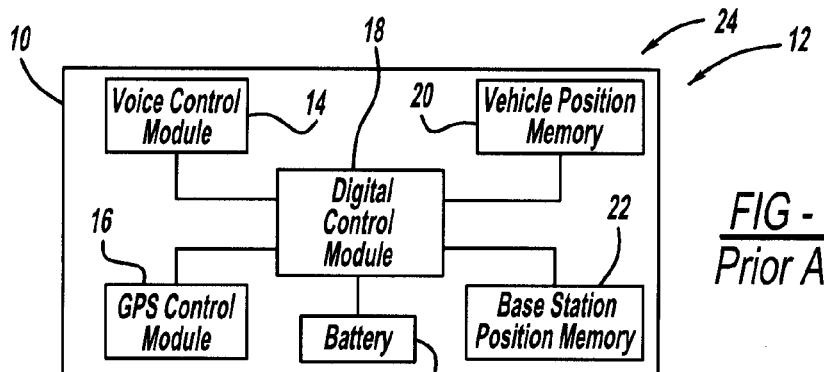
FIG. 1 is a block diagram of a vehicle depicting components of a cellular communication system in accordance with the prior art.
Figure 2:
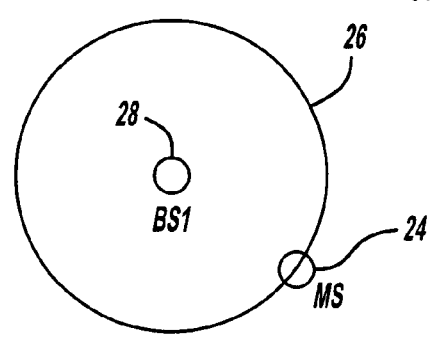
FIG. 2 is a diagram depicting a base station and a mobile station experiencing a condition of overreach in accordance with the prior art.
Figure 3:
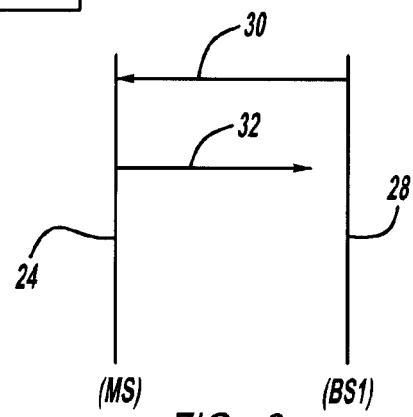
FIG. 3 is a diagram depicting a communication range between a mobile station and a base station, including a condition of overreach in accordance with the prior art.
Figure 4:
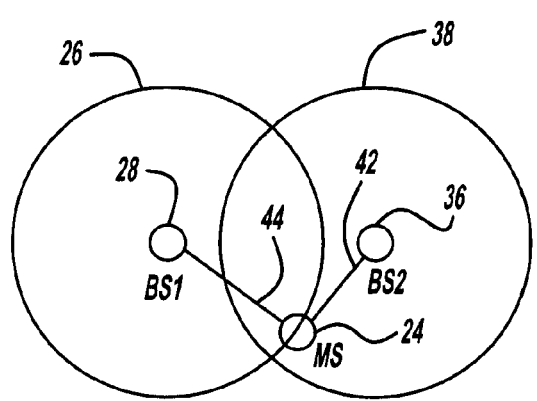
FIG. 4 is a diagram depicting multiple base stations with a single mobile.

The present teachings will now be described more fully with reference to FIGS. 1-10 of the accompanying drawings. FIG. 4 depicts a first base station ("BS1") 28, which may have a communication range 26 or broadcast range 26. Similarly, a second base station ("BS2") 36 may have a broadcast or communication range 38 that overlaps communication range 26 of BS1 28. A mobile station ("MS") 24, because it may be part of or within vehicle 10, may be at a limit of communication range 26 of downlink signal 30, which means that a mobile station ("MS") 24 may receive downlink signal 30, but may move within communication range 38 of BS2 36 and also receive downlink signal 30. More specifically, for example, downlink signal 30 may be received by voice control module 14 and/or GPS control module 16, depending upon the content of a downlink communication packet, and further processed by digital control module 18. However, even though MS 24 may be able to receive a downlink signal 30 from each of BS1 28 and BS2 36, MS 24 may not necessarily be able to communicate with BS1 and BS2 36 do to an overreach condition. Throughout the explanation of the teachings of the present disclosure, BS1 28 may represent a base station for a first cellular phone company that offers cellular service and BS2 36 may represent a base station for a second cellular phone company, which is different from the first cellular phone company that offers cellular service.

Figure 5:
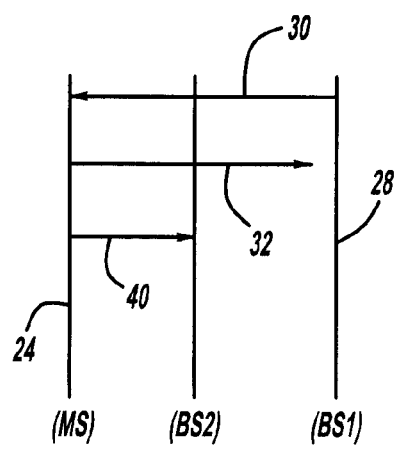
FIG. 5 is a diagram depicting communication ranges between a mobile station and multiple base stations.

As depicted in FIG. 4, a reason that MS 24 is able to receive downlink signal 30, is because MS 24 is within range 26 of BS1 28 and range 38 of BS2 36. However, MS 24 is only able to successfully return uplink signal 40 to BS2 36 because a straight-line distance 42 between MS 24 and BS2 36 is less than a straight-line distance 44 between MS 24 and BS1 28, with all other communication conditions between MS 24 and BS2, and between MS 24 and BS1, being equal. Stated differently, BS2 36 is within communication range of MS 24. Accordingly, as depicted in FIG. 5, uplink signal 40 is received by BS2 36 and communications, such as cellular communications consistent with telematics communication (e.g. voice and GPS transmissions), may be transmitted. Thus, when the communication scenarios depicted in FIGS. 4 and 5 occur, DCM 18 may utilize a preferred roaming list ("PRL") and change frequency or communication channels from that associated with BS1 28 to that associated with BS2 36. The PRL may be a list of base stations that reside in a memory location of DCM 18. Moreover, the PRL may list the frequency bands or channels that the DCM 18 (i.e. the cellular phone capabilities of the DCM 18) may use in various geographic locations, such as within a country. The frequency bands within cellular phone systems are technically called "blocks" and thus lists of blocks may be stored.

The part of the list for each geographic area may be ordered by the frequency bands that the cellular communication system 12 should try to use first; therefore, it may be considered a priority list for which base station towers cellular communication system 12 should first attempt to use. As an example, if mobile station 24 normally subscribes to cellular service with Company A, and MS 24 were travelling in an area with no Company A coverage, weak Company B coverage, and strong Company C coverage. The PRL would instruct DCM 18 to look for cellular base station towers using Company A's frequency band for that geographic area. Finding no Company A cellular base station towers, DCM 18 might instruct DCM 18 to search for cellular towers in Company B's band next, perhaps because Company A's roaming agreement with Company C was not as favorable, or none existed. DCM 18 may use Company A, Company B or Company C's base station, depending upon which is able to receive an uplink signal from MS 24. Since a PRL instructs DCM 18 "where" to search for a cellular signal, as carrier networks change over time, updating a PRL may be required for a transceiver of DCM 18 to "see" all of the coverage that it should. Thus, when DCM 18 determines that it is not able to communicate with BS1 28 with an uplink signal 32, DCM 18 automatically transmits an uplink signal to BS2 36 using uplink signal 40, which is a different band or frequency than uplink signal 32.

Figure 6:
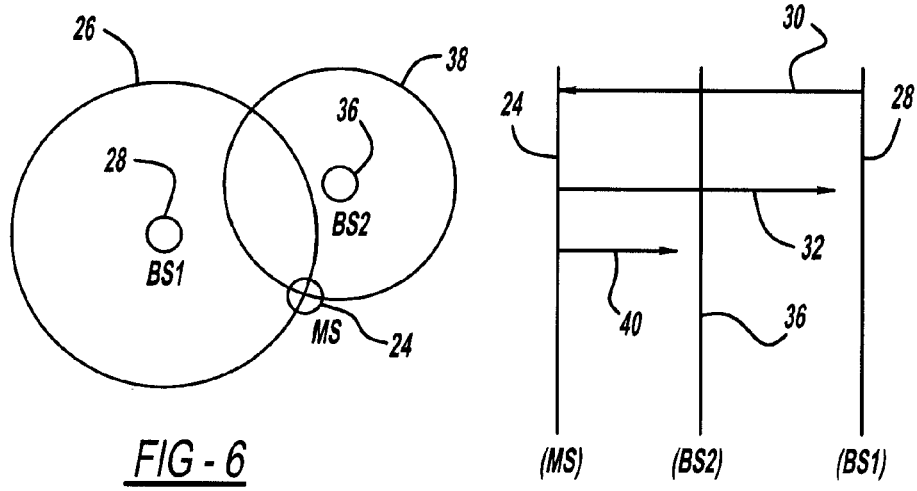
FIG. 6 is a diagram depicting multiple base stations with a single mobile station at a limit of communication ranges of both base stations.
Figure 7:
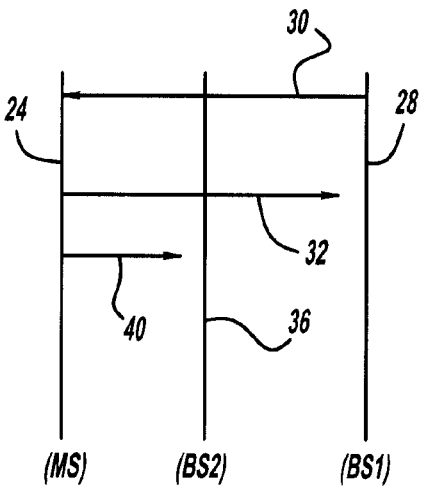
FIG. 7 is a diagram depicting communication ranges between a mobile station and multiple base stations.
Figure 8:
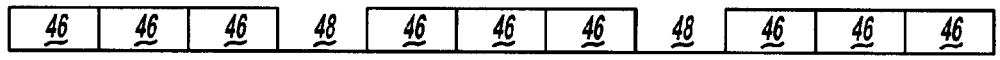
FIG. 8 is a diagram representing a communication packet transmission scenario.
Figure 9:
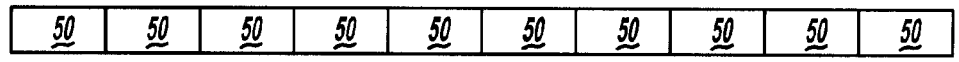
FIG. 9 is a diagram representing a communication packet transmission scenario.

FIGS. 6 and 7 depict another communications scenario in which MS 24 has moved to an edge of range 26 of BS1 28 and an edge of range 38 of BS2 36. In such scenarios, it is possible that MS 24 may receive downlink signal 30 as depicted in FIG. 7; however, both of BS1 28 and BS2 36 are unable to receive uplink signals from MS 24. For instance, as depicted in FIG. 7, BS1 28 is unable to receive uplink signal 32 and BS2 36 is unable to receive uplink signal 40 because of an overreach condition. When the scenarios depicted in FIGS. 6 and 7 occur, FIG. 8 depicts a possible battery power-saving scenario that may be invoked. More specifically, FIG. 8 depicts an uplink transmission scenario that may be utilized when a vehicle ignition is off ("IG-OFF") to conserve power of battery 34. In such an uplink transmission scenario, signal transmission periods 46 represent attempts by DCM 18 to successfully transmit an uplink signal to a base station, such as BS1 28 and/or BS2 36. Periods 48 are representative of sleep periods, which are periods of time when no signal transmission occurs. Sleep periods preserve battery power of a vehicle battery 34, which may be drained or consumed when a vehicle engine is not operating to effectively charge battery 34. FIG. 9 represents a signal transmission regarding multiple signal transmission packets 50 from, for instance, MS 24 to BS1 28 or BS2 36 when a vehicle ignition is turned on ("IG-ON"). When a vehicle ignition is off, a vehicle engine is assumed to not be operating and thus not charging vehicle battery 34; however, when an ignition of vehicle 10 is on, an engine of such vehicle is assumed to be operating and thus charging vehicle battery 34, so that depletion of battery power is not of concern.

Figure 10:
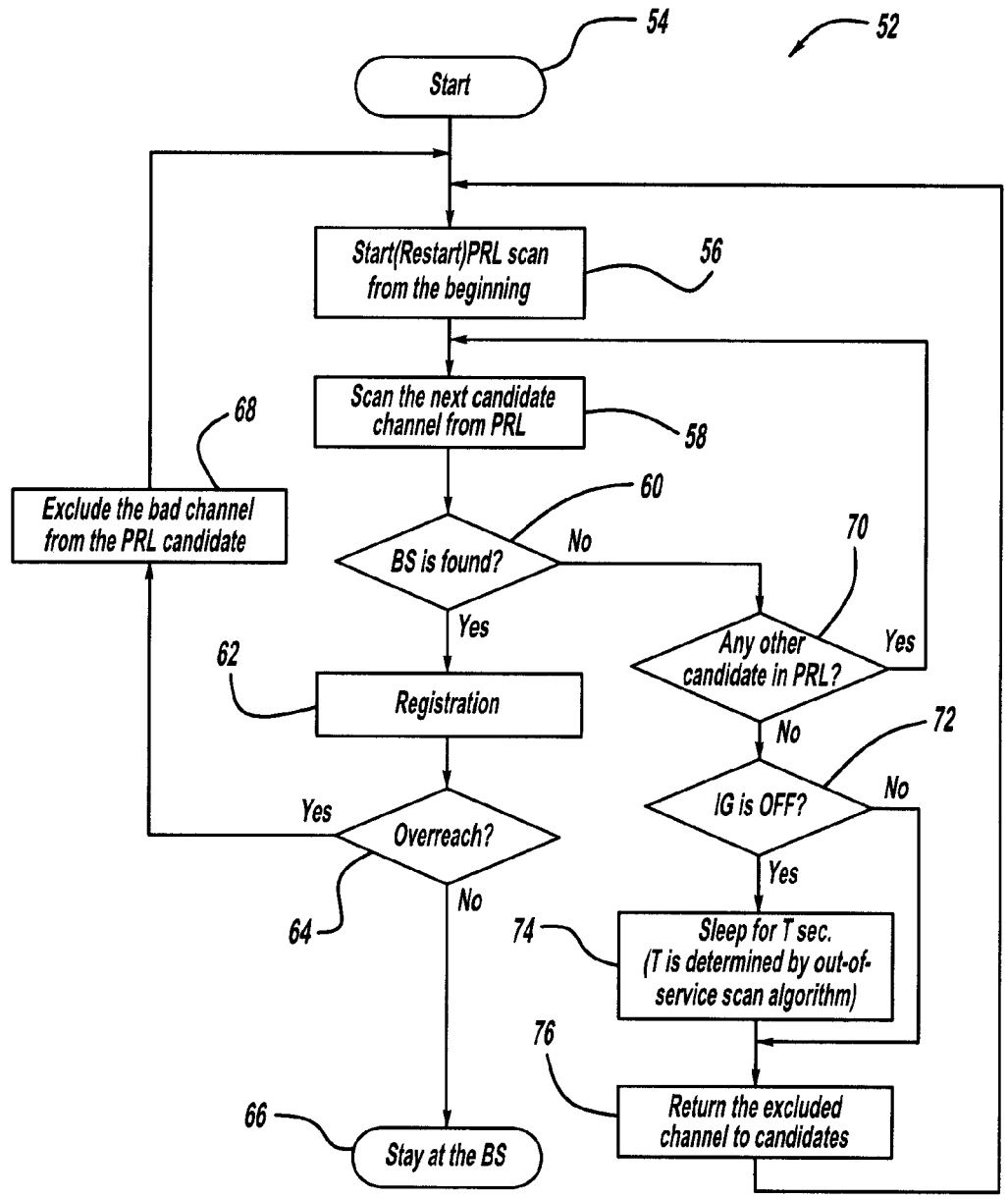
FIG. 10 is a flowchart of a method of conducting cellular communication to conserve battery power.

Turning now to FIG. 10, a flowchart 52 depicts logic of a method of communicating; moreover, because of an advantage of saving battery power, flowchart 52 also depicts logic of a method of saving battery power. Continuing, flowchart 52 begins at start block 54 and proceeds to block 56 where the logic begins scanning a preferred roaming list from its beginning. The logic proceeds to block 58 where scanning of the next candidate channel from the PRL occurs. Upon initial scanning of the PRL and scanning at least one subsequent candidate channel from the PRL, logic proceeds to decision block 60 and inquires whether a base station has been identified; that is, finding a base station means that a base station, such as BS1 28 or BS2 36 has successfully transmitted a downlink signal to a mobile station, such as MS 24. Actually, base stations BS1 28 or BS2 36 may continuously transmits a downlink signal as a broadcast signal. When, and if a base station successfully transmits a downlink signal to a mobile station, logic proceeds to block 62 so that the mobile station may register or at least attempt to register with the base station. Registering with a base station means that the mobile station, such as MS 24, successfully transmits an uplink signal to the base station, such as base station BS1 28 or BS2 36, which previously successfully transmitted to MS 24. Successfully transmitting an uplink signal may include an intended base station successfully receiving such an uplink signal. Thus, after a mobile station has its uplink signal successfully received by a base station, registration or registering the mobile station may be complete. If registration of a mobile station with a base station is successful, that is if a base station successfully receives an uplink signal from a mobile station, then no condition of overreach exists and flowchart logic proceeds through decision block 64 to block 66 so that communications may continue with the base station with which mobile station has successfully registered. Logic may then return to start block 54.

At decision block 64 the logic may indicate that a condition of overreach exists between a mobile station and a base station. A condition of overreach exists when a mobile station is able to receive a downlink signal from a base station, but the receiving mobile station is unable to successfully have its uplink signal received by the transmitting mobile station, because of the distance between the mobile station and an intended base station. Thus, when a condition of overreach exists the logic proceeds through decision block 64 to block 68 where the channel (i.e. communication frequency) is excluded as a candidate of the PRL, because communication is deemed temporarily impossible. The Logic then proceeds again to block 56 where the PRL is again scanned from its beginning through subsequent candidate channels on the PRL list, which is indicated at block 58.

Continuing with the logic of flowchart 52, upon arriving at decision block 60 during any iteration of the logic of flowchart 52, if a BS is not found, the logic proceeds to decision block 70. A base station is considered to not be found when no downlink signal is received by a mobile station. At decision block 70, the logic inquires whether any other candidate channel is on the preferred roaming list. If another candidate is on the preferred roaming list, then the logic returns to block 58 to scan such next candidate channel; however, if no other channels are part of the preferred roaming list, then the logic proceeds to decision block 72. At decision block 72, the logic considers whether the vehicle ignition is turned off. If the vehicle ignition is off, the logic proceeds to step 74 where battery draining activities of the logic of flowchart 52 are suspended. More specifically, at block 74, the logic is suspended by going into a pause or sleep mode for a predetermined amount of time, such as "T seconds," as depicted in FIG. 8. "T seconds" may be determined by an out-of-service scan algorithm, for example, or set by a computer programmer upon installation of the logic of flowchart 52, or by a vehicle user on an interface. In the event that a vehicle ignition is not off, that is, a vehicle ignition is on ("IG-ON"), then the activity of block 74 is not performed, but rather, is bypassed as indicated in FIG. 10. Upon the activity or task of block 74 being performed or bypassed given the result of decision block 72, the logic proceeds to step 76 where any excluded channel of the preferred roaming list is returned to the preferred roaming list as a potential candidate for selection by a mobile station. The logic then returns to block 56 to begin scanning the PRL from its beginning.

Thus, as an example, and with reference to FIGS. 1-10, a method of communicating between base stations BS1 28, BS2 36 and digital control module 18 of mobile station 24 may entail: scanning a preferred roaming list (e.g. which may be stored in digital control module 18) of base stations from a beginning of the preferred roaming list, transmitting a first downlink signal (which may be a radio frequency) from first base station 28 to mobile station 24, determining that the downlink signal into mobile station 24 from first base station 28 has been received, transmitting an uplink signal (which may be a radio frequency) from mobile station 24 to first base station 28 when it is determined that the downlink signal from first base station 28 has been received, determining that a condition of overreach exists between first base station 28 and mobile station 24 when the uplink signal is not acknowledged (i.e. successfully received) by first base station 28. Moreover, the method may include excluding the specific channel of first base station 28 from the preferred roaming list for which the condition of overreach exists, then re-scanning the preferred roaming list from the first entry of the preferred roaming list (the preferred roaming list absent the specific channel), and then transmitting a second downlink signal (which may be a radio frequency) from a second base station 36 to mobile station 24, determining that the second downlink signal into mobile station 24 from second base station 36 has not been received, inquiring whether a third base station exists on the preferred roaming list, and determining that a third base station does not exist on the preferred roaming list.

Additionally, the method of communicating may include determining that a vehicle ignition of vehicle 10 is off, invoking a sleep mode of digital control module 18 to prevent digital control module 18 from communicating, and returning (i.e. restoring) the specific channel of first base station 28 to the preferred roaming list for which the condition of overreach exists. Moreover, the method of communicating may include determining that the vehicle ignition is not off, and returning the specific channel of the first base station on the preferred roaming list for which the condition of overreach exists. Subsequently, rescanning the preferred roaming list from the first entry of the preferred roaming list, which includes any previously excluded base stations (i.e. including their communication frequencies).

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method of communicating between a selected base station and a mobile station comprising:

scanning a first entry of a preferred roaming list for a first base station using the mobile station;

transmitting a downlink signal from the first base station to the mobile station;

determining that the downlink signal to the mobile station from the first base station has not been received using the mobile station;

scanning the preferred roaming list for a second base station different than the first base station using the mobile station;

identifying that the second base station does not exist on the preferred roaming list; and inquiring whether a vehicle ignition is off upon determining that the second base station does not exist.

2. The method of communicating according to claim 1, further comprising:

determining that the vehicle ignition is on; and returning the first base station to the preferred roaming list.

3. The method of communicating according to claim 1, further comprising:

determining that the vehicle ignition is off; and invoking a sleep mode of the digital control module.

4. The method of communicating according to claim 3, further comprising:

returning the first base station to the preferred roaming list.

5. The method of communicating according to claim 1, further comprising:

returning the first base station to the preferred roaming list.

6. The method of communicating according to claim 1, further comprising:

determining that the downlink signal to the mobile station from the first base station has been received using the mobile station; and identifying the first base station as the selected base station when the downlink signal has been received.

7. A method of communicating between a selected base station and a digital control module of a mobile station comprising:

scanning a preferred roaming list of a plurality of base stations from a beginning of the preferred roaming list using the mobile station;

transmitting a first downlink signal from a first base station of the plurality of base stations to the mobile station;

determining that the downlink signal into the mobile station from the first base station has been received using the mobile station;

transmitting an uplink signal from the mobile station to the first base station when it is determined that the downlink signal from the first base station has been received;

determining that a condition of overreach exists between the first base station and the mobile station only when the uplink signal is not acknowledged using the first base station;

excluding the first base station from the preferred roaming list for which the condition of overreach exists;

re-scanning the preferred roaming list for a second base station of the plurality of base stations, the second base station being different than the first base station;

transmitting a second downlink signal from the second base station to the mobile station;

determining that the second downlink signal into the mobile station from the second base station has not been received using the mobile station;

determining whether a third base station of the plurality of base stations exists on the preferred roaming list using the mobile station; and determining that the third base station does not exist on the preferred roaming list using the mobile station;

inquiring whether a vehicle ignition is off upon determining that the third base station does not exist.

8. The method of communicating according to claim 7, further comprising:

determining that the vehicle ignition is off;

invoking a sleep mode of the digital control module to prevent the digital control module from communicating; and returning the first base station on the preferred roaming list.

9. The method of communicating according to claim 7, further comprising:

determining that the vehicle ignition is not off;

returning the first base station on the preferred roaming list.

10. The method of communicating according to claim 7, further comprising:

determining that the condition of overreach does not exist between the first base station and the mobile station when the uplink signal is not acknowledged using the first base station; and identifying the first base station as the selected base station when the condition of overreach does not exist.

* * * * *